Oct. 11, 1938.    J. W. AMES    2,132,593
APPARATUS FOR REMOVING RIVETS FROM STRUCTURES
Filed Sept. 2, 1936    4 Sheets-Sheet 2
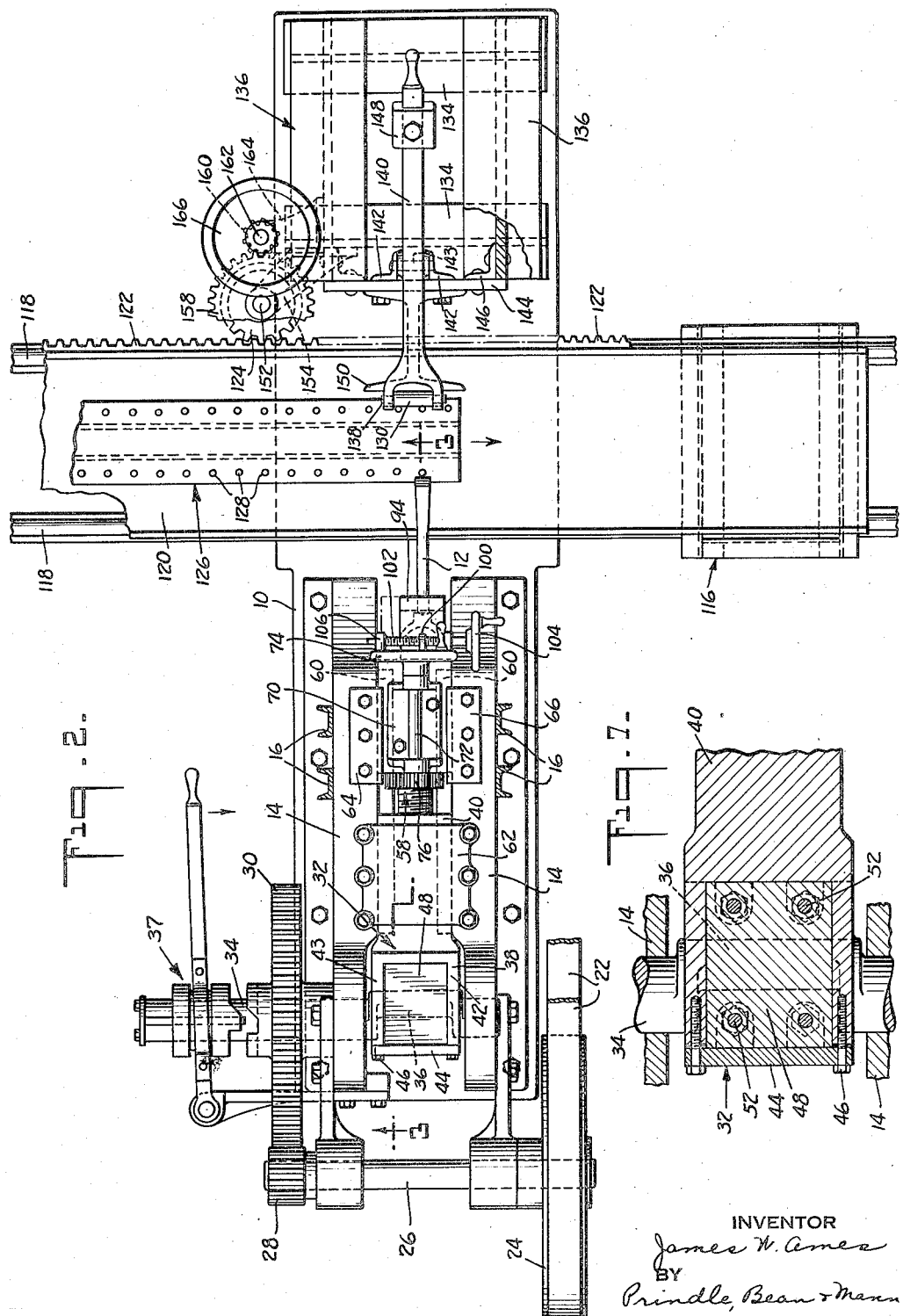
INVENTOR
James W. Ames
BY
Prindle, Bean & Mann
ATTORNEYS Oct. 11, 1938.                J. W. AMES                2,132,593
APPARATUS FOR REMOVING RIVETS FROM STRUCTURES
Filed Sept. 2, 1936                    4 Sheets-Sheet 3
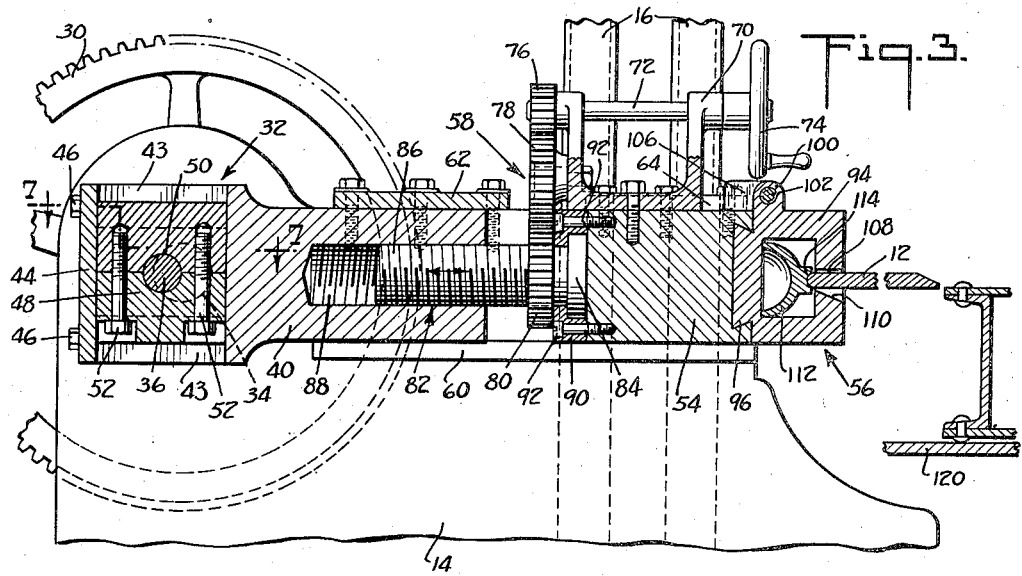
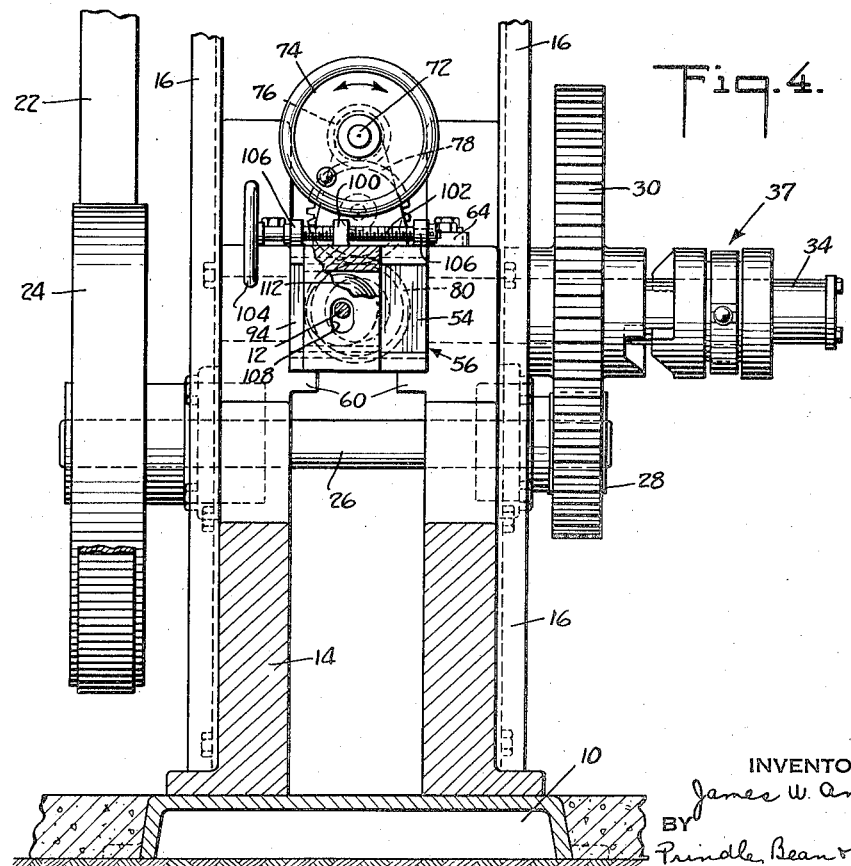
INVENTOR
James W. Ames
BY Prindle, Bean & Mann
ATTORNEYS Oct. 11, 1938.  J. W. AMES  2,132,593
APPARATUS FOR REMOVING RIVETS FROM STRUCTURES
Filed Sept. 2, 1936  4 Sheets-Sheet 4
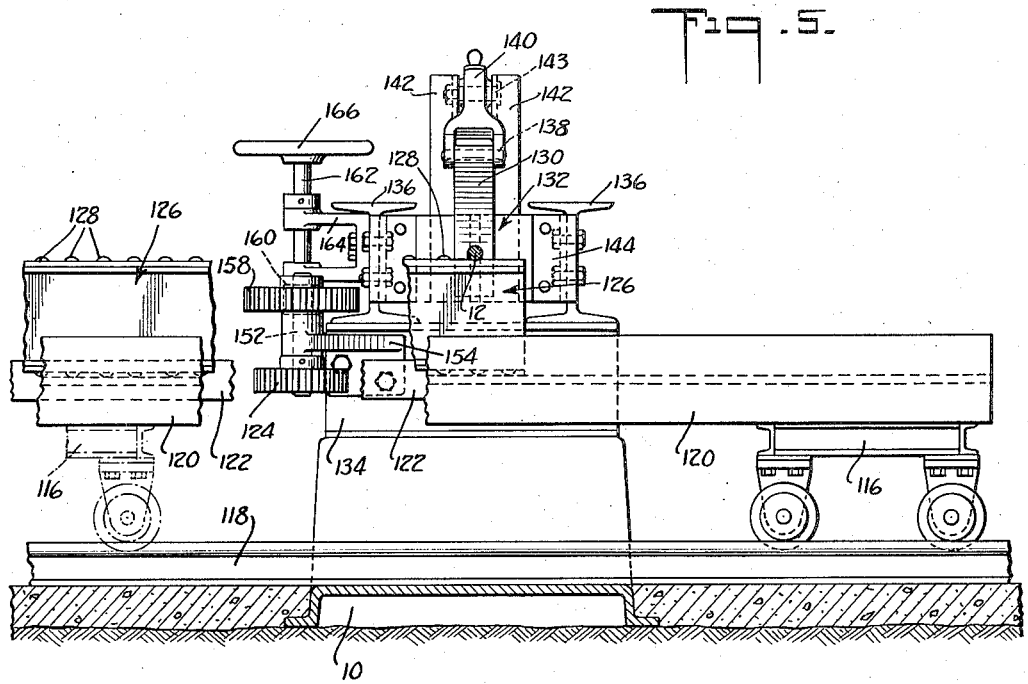
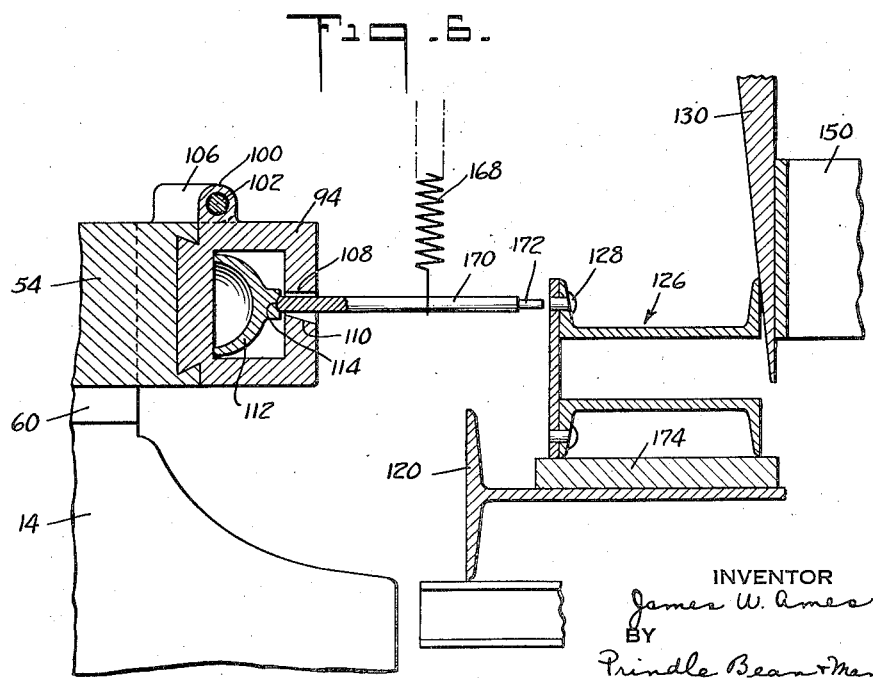
INVENTOR
James W. Ames
BY
Prindle, Bean + Mann
ATTORNEYS Patented Oct. 11, 1938

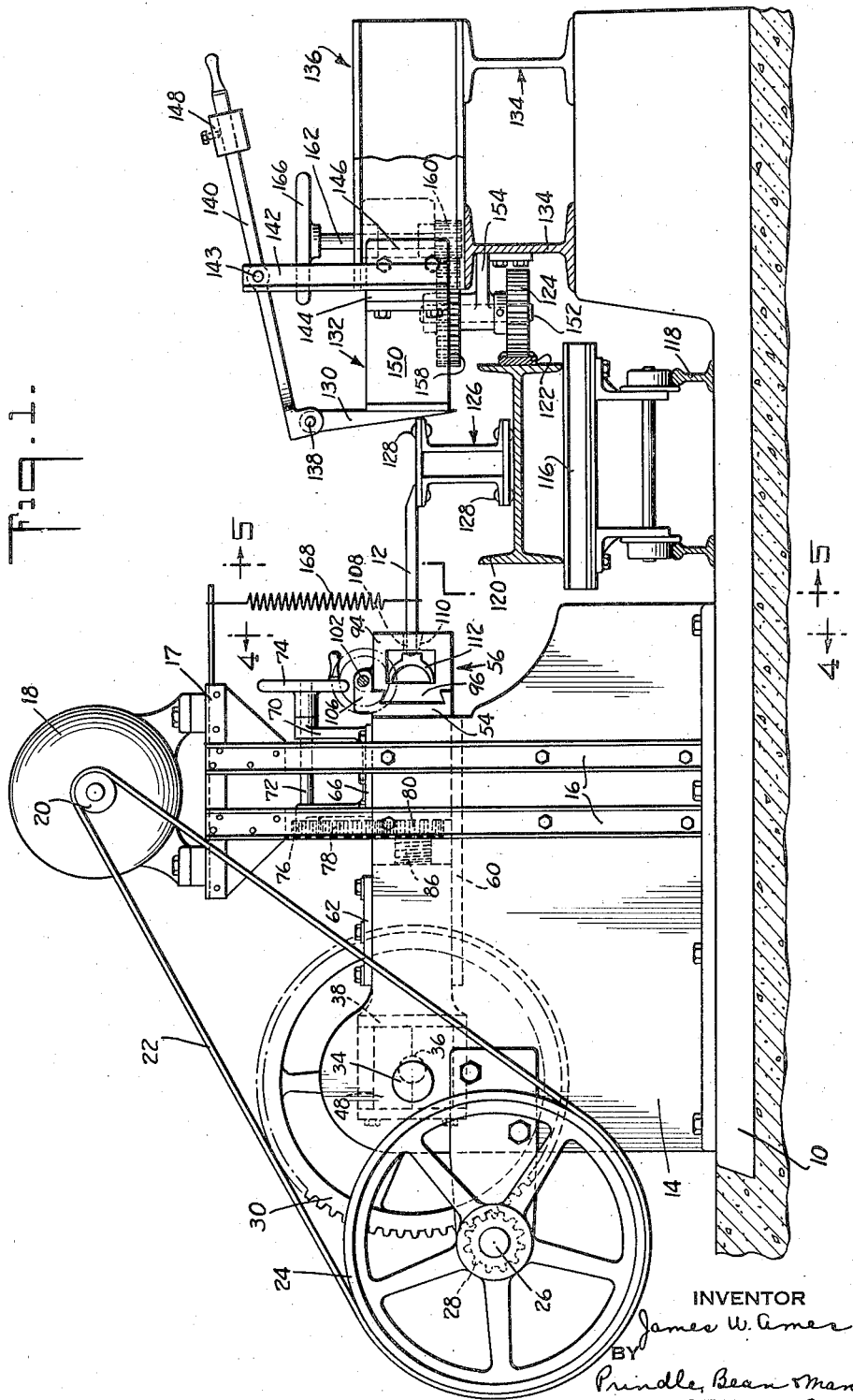

2,132,593

UNITED STATES PATENT OFFICE 2,132,593

APPARATUS FOR REMOVING RIVETS FROM STRUCTURES

James W. Ames, Montclair, N. J.

Application September 2, 1936, Serial No. 99,045

10 Claims. (Cl. 164—49)

This invention relates to apparatus for removing rivets from riveted structures such as girders, columns and the like to recover and utilize the metal in such old structures.

I have shown a preferred form of construction including a movable carrier for the work and means for moving the work and carrier along. The apparatus includes a reciprocating member which actuates a chisel or like tool for shearing off rivets from old riveted beams or the like. As the rivets are sheared off, the work is moved along and then turned to remove other rivets. After all the rivets are sheared off, another tool is used to back out the sheared off rivets, and the individual bars, plates or beams may then be utilized for any purposes desired. While I have shown the best form of my invention known to me at this time it is to be expressly understood that changes may be made within the scope of my invention.

In the drawings:

Fig. 1 represents a front elevation of an apparatus made according to my invention;

Fig. 2 represents a top plan view of the apparatus with parts removed to facilitate the disclosure;

Fig. 3 represents a partial vertical longitudinal cross section taken substantially on line 3—3 of Fig. 2;

Fig. 4 represents a partial vertical transverse cross section taken substantially on line 4—4 of Fig. 1;

Fig. 5 represents an end view looking in the direction of the arrows on line 5—5, with parts broken away and showing the work supporting means and abutment means;

Fig. 6 represents an enlarged longitudinal section of a portion of the apparatus in which the chisel is replaced by a rivet removing tool; and Fig. 7 represents a horizontal section of the bearing for the crank taken substantially on line 7—7 of Fig. 3.

Referring now to the drawings, the reference character 10 generally designates a foundation for my apparatus. The driving mechanism and associated parts for actuating the chisel or like tool 12 will be first described. The support for the driving mechanism includes spaced vertical supporting members 14 suitably secured to the foundation 10. Secured to the members 14 are spaced supports 16 for supporting a table 17 for an electric motor 18. Instead of the motor 18 I may use other forms of power such as gas engines, steam engines, etc. Connected with the driving pulley 20 of the motor 18 is a belt 22 which drives wheel 24. Secured to the same shaft 26 as the wheel 24, is a pinion 28 which meshes with a gear 30 which is adapted to drive the reciprocating member generally designated 32.

Gear 30 is loosely mounted on a shaft 34 having a crank 36 for reciprocating member 32. A clutch generally designated 37 is keyed to shaft 34 for transmitting power to the shaft from the motor 18 when desired. The reciprocating member 32 at one end has a hollow head 38 and extension 40. The head 38 has spaced side arms 42 and 43 to which an end plate 44 is suitably secured as by bolts 46. The head 38 is open at the top and bottom to permit sliding movement of bearing parts 48 (see Fig. 3). The bearing parts 48 are provided with cut away portions 50 to form an opening to surround crank 36. The bearing parts 48 are suitably secured together as by bolts 52. As the crank 36 is rotated by the shaft 34, the bearing parts 48 move as a unit and slide in the head 38 to cause reciprocation of the member 32. The member 32 has only a reciprocatory movement whereas the bearing parts 48 have a rotary motion.

The reciprocating member 32 includes a ram 54 (see Fig. 3) which has means 56 for carrying one end of the tool 12, the ram 54 having an adjustable connection 58 with extension 40. The extension 40 and ram 54 are slidably mounted on flanges 60 on supporting members 14 and between members 14. A top plate 62 is secured to the top of members 14 and is adapted to hold the extension against flanges 60. Separate plates 64 and 66 are provided to hold the ram 54 on flanges 60. These plates are secured to supporting members 14. From this construction it will be seen that the member 32 can only reciprocate in a straight line.

As stated above the extension 40 and ram 54 are connected by an adjustable connection 58 for changing the effective length of the reciprocating member 32. This adjustable connection forms part of the reciprocating member and has a U-shaped arm 70 secured to ram 54. Rotatably mounted in arm 70 is a shaft 72 having an operating wheel 74 at one end and a pinion 76 at its other end. Pinion 76 meshes with gear 78 which meshes with gear 80 secured to a screw member 82 having a head 84 and threaded body 86. The threaded body 86 is screwed into the threaded opening 88 in extension 40. The head 84 is rotatably mounted and is held against ram 54, by a flanged ring 90 mounted on the ram by bolts 92. Rotation of the wheel 74 will cause rotation of screw member 82 and will bring the extension 40 and ram 54 closer together or further apart for adjusting the position of the tool 12.

Slidably mounted on the outer end of ram 54 is a hollow member 94 in which one end of the tool 12 is mounted. This member has a dovetail fit 96 with the outer end of ram 54 and is adapted to be moved transversely of the apparatus for adjusting the chisel or tool 12 transversely of the apparatus. See Figs. 3 and 4. The hollow member 94 has an upstanding threaded lug 100 (see Fig. 4) for receiving a threaded bolt 102 having an operating wheel 104. The bolt is rotatably mounted and held in position between lugs 106. Rotation of the wheel 104 will cause movement of the hollow member 94 so that the chisel or other tool may be properly positioned laterally. The hollow member has an opening 108 to receive one end of the chisel 12. It will be noted that the opening 108 has a bevelled side 110 to assist in bringing the chisel to proper position during the operation of the device. Mounted inside the hollow member is an arched breaker 112 which cooperates with the end of the chisel to transmit energy from the ram 54 to the chisel. The breaker or overload release 112 has a depression 114 to receive the inner end of chisel 12. The purpose of the breaker is to prevent breaking of the machine, chisel or tool if there is any obstruction in the way of the chisel or if the chisel is improperly placed, for instance, against the beam rather than the rivet so that the breaker rather than chisel will break. The member 94 has an open end for removing broken parts and substituting a new breaker.

The movable carrier means for the work will next be described. This means comprises trucks 116 mounted on rails 118. One or more trucks may be used. Mounted on trucks 116 is an I-beam 120 placed in a horizontal position. A rack 122 is secured to one side of the beam 120 which meshes with gear 124 forming part of the advancing means to be presently described. Positioned on the beam 120 is the work 126 from which the rivets 128 are to be removed. A wedge shaped removable member 130 is placed between the work 126 and the abutment means 132 so that the work 126 is securely held when the tool 12 shears off the rivets. The abutment means 132 includes one lower tier of I-beams 134 and another upper tier 136 suitably secured together. The member 130 is pivoted at 138 to an operating handle 140 pivoted to vertical arms 142 at 143. These arms 142 are secured to the rear face of plate 144 fastened to the top tier 136 by angle irons 146. An adjustable counterweight 148 is provided on handle 140 to assist in moving the member 130. Fastened to the front face of plate 144 is a section of an I-beam 150 which forms part of the abutment means against which the work is pressed during the shearing of the rivets. The wedge shaped member 130 is positioned between beam section 150 and the work 126 so that when it is desired to move the work along for another position for shearing off a rivet, the member 130 is raised to permit such movement by the advancing means. The wedge shaped member 130 also compensates for any irregularities in the shape of the work 126. Some of the pieces to be worked on are not straight but have been bent out of shape. The member 130 also functions to prevent any binding of the work against the abutment means. If the work 126 is bent or if the tracks 118 are not correctly placed, binding would occur if it were not for the wedge shaped member.

The means for moving the work along will now be described. The gear 124 as above described meshes with rack 122. This gear is on shaft 152 (see Fig. 5) which is rotatably mounted in arm 154 secured to the lower beam sections of tier 134. Mounted on shaft 152 above gear 124 is a larger gear 158 which meshes with a pinion 160 on shaft 162. Shaft 162 is rotatably mounted in arm 164 secured to the beam sections of upper tier 136. At its upper end shaft 162 has an operating wheel 166. Rotation of the wheel causes rotation of the meshed gears and pinion and the resulting rotation of shaft 124 meshing with rack 122 causes movement of the I-beam 120.

The tool 12 is directed by an operator of the machine but preferably a spring 168 is attached at its one end to the supporting table 17 for the motor 18 so as to assist the operator in holding the tool.

After the rivets are sheared off it is necessary to remove them from the holes. To do this a tool 170 is substituted for the chisel or tool 12 (Fig. 6). The tool 170 has a cylindrical end 172 which is adapted to enter the hole in the work and force the rivet therefrom. The rest of the apparatus is the same. However, when positioning the work for this operation it is necessary to turn the work on its side and then a block 174 is used to support the work at the proper height.

Before the operation of the apparatus it is necessary to position the work 126 on the I-beam 120 so that the work is adjacent the abutment means 132. The wedge shaped member 130 is moved into wedging position between the work 126 and I-beam section 150 to hold the work securely. By means of the hand wheel 104 the hollow member 94 may be moved to position so that the end of the cutting tool or chisel 12 is positioned right for shearing a rivet.

The operation will now be given. With the motor 18 running, the clutch 37 is thrown in and this causes rotation of shaft 34 and crank 36 to cause reciprocation of the reciprocating member 32. The operator holds the chisel 12 with its rear end against depression 114 of the breaker. As this member 32 moves toward the work 126, the chisel 12 is forced against a rivet and shears off the rivet head. The clutch is then thrown out and the wedge shaped member 130 is operated by handle 140 and moved upwardly. Then the hand wheel 166 is turned to cause rotation of gear 124 which meshes with rack 122 to move the work along a short distance until the next rivet is moved into correct position. The wedge shaped member is then moved down between the work and the abutment means 132 and another shearing operation is proceeded with. While I have shown a tool for shearing one rivet, it is to be understood that I can shear two rivets at a time.

After all or a number of rivets have been sheared off, the work is laid on its side as shown in Fig. 6 and the tool 170 having a cylindrical end 172 is substituted for the chisel 12. The apparatus is then operated as before with the operator directing and holding the end 172 of the tool 170 against the rivet end so that when the ram 54 of the reciprocating member 32 moves toward the work the rivet will be forced from its hole.

If it is desired to move the tool closer or further from the work, it is only necessary to operate hand wheel 74 which will move the extension 40 further away or closer to the ram 54.

The breaker 112 is provided to prevent breaking of the machine or tools 12 or 170 in operation. If the tool is not positioned correctly or is inadvertently allowed to abut the work, the tool would become damaged or broken. Especially is this true of tool 170. To prevent such damage or breakage I provide the breaker which is of such strength to stand the ordinary impact of the tool when used properly but which will break if the tool is subjected to impacts too big for the tool, or if the tool is incorrectly placed at the beginning of the shearing operation.

It is to be understood that the foregoing example is given only by way of illustration and that the same may be modified in many particulars without departing from the spirit of my invention.

What I claim is:

1. An apparatus of the character described including, in combination, a support, a member reciprocably mounted thereon, said member being provided with means for receiving a tool, means for reciprocating said reciprocable member, said reciprocable member comprising a plurality of connected parts forming a sectional member, and means whereby said parts may be moved away from or toward each other to change the length of said reciprocable member.

2. An apparatus of the character described including, in combination, a support, a member reciprocably mounted thereon, said member being provided with means for receiving a tool, means for reciprocating said reciprocable member, said reciprocable member comprising a plurality of connected parts forming a sectional member, and means whereby said parts may be moved away from or toward each other to change the length of said reciprocable member, said last mentioned means including a threaded member in threaded engagement with one of said parts and means for rotating said threaded member to change the relative positions of said parts of said reciprocable member.

3. An apparatus of the character described for removing rivets from old iron structures, including, in combination, a support, a member reciprocably mounted thereon, means for reciprocating said reciprocable member, a tool receiving member slidably mounted on one end of said reciprocable member and forming a longitudinal extension of the same, and means for sliding said tool receiving member transversely of said reciprocable member for obtaining correct positioning of said tool receiving member when said apparatus is to be operated.

4. An apparatus of the character described including, in combination, a support, a member reciprocably mounted thereon, means for reciprocating said reciprocable member, a hollow member slidably mounted on one end of said reciprocable member and provided with a breaker, said breaker having a depression for receiving one end of a tool to be operated by said apparatus, said breaker being adapted to break if too great a force is applied to the apparatus or tool, and means for moving said hollow member transversely of said reciprocable member for correctly positioning said hollow member.

5. An apparatus of the character described including, in combination, a support, a member reciprocably mounted thereon, means for reciprocating said reciprocable member, a tool receiving member slidably mounted on one end of said reciprocable member and having an opening with a bevelled side permitting free entry of one end of a tool therein, and means for moving said tool receiving member transversely of said reciprocable member for adjustment thereof.

6. An apparatus of the character described including, in combination, means for operating a tool to remove rivets from old riveted articles, means for supporting and moving along an article from which rivets are to be removed, and means opposite the tool and the tool operating means against which the article is forced when the apparatus is operated, said last mentioned means including a fixed abutment and a movable member adapted to be positioned between said abutment and the article.

7. An apparatus of the character described including, in combination, means for operating a tool to remove rivets from old riveted articles, means for supporting and moving along an article from which rivets are to be removed, and means opposite the tool operating means against which the article is forced when the apparatus is operated, said last mentioned means including a fixed abutment and a wedge shaped member adapted to be positioned between said abutment and the article, said wedge shaped member having a pivoted handle whereby it is operated.

8. An apparatus of the character described including, in combination, means for operating a tool to remove rivets from old riveted articles, means for supporting an article from which rivets are to be removed, abutment means opposite the tool operating means against which the article is forced when the tool is moved against a rivet, said abutment means including a fixed abutment and a movable member adapted to be positioned between the abutment and the article, and means on said abutment means associated with said article supporting means whereby said article supporting means may be moved along.

9. An apparatus of the character described including, in combination, means for operating a tool to remove rivets from old riveted articles, means for supporting an article from which rivets are to be removed, abutment means opposite the tool operating means against which the article is forced when the tool is moved against a rivet, said abutment means including a fixed abutment and a movable wedge shaped member between said abutment and the article whereby the wedge shaped member may be raised and the article moved along to next position, and means on said abutment means whereby said article supporting means may be moved along.

10. An apparatus of the character described including, in combination, means for operating a chisel to shear off rivets from old riveted articles, a rolling support for the article, abutment means opposite the chisel operating means against which the article is forced when a rivet is being sheared off, said abutment means including a fixed abutment and a movable wedge between said abutment and the article, a rack on said rolling support, and gear means on said fixed abutment meshing with said rack and adapted to be operated to move said rolling support along to present the article for the next shearing operation.

JAMES W. AMES.